United States Patent
Jiao et al.

(10) Patent No.: US 10,817,786 B2
(45) Date of Patent: Oct. 27, 2020

(54) MULTI-ROUND SESSION INTERACTION METHOD AND SYSTEM, AND COMPUTER DEVICE

(71) Applicant: Baidu Online Network Technology (Beijing) Co., Ltd., Beijing (CN)

(72) Inventors: Zengtao Jiao, Beijing (CN); Guanchun Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 38 days.

(21) Appl. No.: 15/119,348

(22) PCT Filed: Oct. 21, 2015

(86) PCT No.: PCT/CN2015/092462
§ 371 (c)(1),
(2) Date: Jun. 26, 2017

(87) PCT Pub. No.: WO2016/062255
PCT Pub. Date: Apr. 28, 2016

(65) Prior Publication Data
US 2017/0308791 A1  Oct. 26, 2017

(30) Foreign Application Priority Data
Oct. 22, 2014  (CN) .......................... 2014 1 0569388

(51) Int. Cl.
*G06N 5/02* (2006.01)
*G06N 20/00* (2019.01)
*G06F 16/901* (2019.01)

(52) U.S. Cl.
CPC ........... *G06N 5/02* (2013.01); *G06F 16/9027* (2019.01); *G06N 20/00* (2019.01)

(58) Field of Classification Search
CPC ........ G06N 5/02; G06N 99/005; G06N 5/022; G06N 5/04
See application file for complete search history.

(56) References Cited

U.S. PATENT DOCUMENTS 8,538,982 B2 * 9/2013 Effrat ................. G06F 16/3322
                                                          707/769
8,738,627 B1 * 5/2014 Khoshnevisan .. G06F 17/30873
                                                          707/722

(Continued)

FOREIGN PATENT DOCUMENTS

CN      101639831 A    2/2010
CN      101655862      2/2010

(Continued)

OTHER PUBLICATIONS

Óscar Ferrández, Rubén Izquierdo, Sergio Ferrández, and José Luis Vicedo, "Addressing ontology-based question answering with collections of user queries", Oct. 31, 2008, Information Processing and Management 45, pp. 175-188. (Year: 2008).*

(Continued)

*Primary Examiner* — Kamran Afshar
*Assistant Examiner* — Ying Yu Chen
(74) *Attorney, Agent, or Firm* — Knobbe, Martens, Olson & Bear, LLP (57) ABSTRACT

A method for interacting in a multi-round session includes: receiving user requirement information; mapping the user requirement information to standard requirements contained in nodes of a plurality of locally preset requirement structure trees, the standard requirement contained in each node being a general requirement of standard requirements contained in sub-nodes of the node in the requirement structure trees; and outputting content of the standard requirements contained in sub-nodes of a selected non-leaf node or session information corresponding to a selected leaf node, if the standard (Continued)

requirement contained in the selected node in the plurality of requirement structure trees matches the user requirement information.

10 Claims, 3 Drawing Sheets

(56) References Cited

U.S. PATENT DOCUMENTS

| | | | |
|---|---|---|---|
| 9,785,705 B1* | 10/2017 | Cartright | G06F 17/30705 |
| 2001/0007987 A1 | 7/2001 | Igata | |
| 2006/0074980 A1* | 4/2006 | Sarkar | G06F 17/3089 |
| 2010/0223223 A1* | 9/2010 | Sandler | G06F 17/30743 706/50 |
| 2011/0225107 A1 | 9/2011 | Khosravy | |
| 2012/0166373 A1* | 6/2012 | Sweeney | G06N 5/02 706/14 |
| 2013/0254209 A1 | 9/2013 | Kang | |
| 2014/0025660 A1* | 1/2014 | Mohammed | G06F 17/30554 707/722 |
| 2014/0258285 A1 | 9/2014 | Lavine | |
| 2016/0269214 A1 | 9/2016 | Popovic et al. | |

FOREIGN PATENT DOCUMENTS

| | | |
|---|---|---|
| CN | 102800006 | 11/2012 |
| CN | 103020052 A | 4/2013 |
| CN | 103593412 | 2/2014 |
| CN | 103885947 A | 6/2014 |
| CN | 104408639 A | 3/2015 |
| JP | 2005316998 | 11/2005 |
| JP | 2010140154 | 6/2010 |
| KR | 100820746 | 4/2008 |
| KR | 20120088632 | 8/2012 |

OTHER PUBLICATIONS

Lei Zou, Ruizhe Huang, Haixun Wang, Jeffrey Xu Yu, Wenqiang He, and Dongyan Zhao, "Natural Language Question Answering over RDF—A Graph Data Driven Approach", Jun. 2014, SIGMOD'14 Proceedings of the 2014 ACM SIGMOD International Conference on Management of Data, pp. 313-324. (Year: 2014).*

Shady Elbassuoni and Roi Blanco, "Keyword Search over RDF Graphs", Oct. 2011, CIKM'11, pp. 237-242. (Year: 2011).*

Written Opinion of the International Searching Authority dated Jan. 27, 2016 for International Application No. PCT/CN2015/092462 in 12 pages (English translation in 7 pages).

International Search Report for Application No. PCT/CN2015/092462 dated Jan. 27, 2016, in 4 pages.

Jing Chen, Yang Cheng and Dawei Nie, "Product configuration method based on ontology mapping," 2013 IEEE 4th International Conference on Software Engineering and Service Science, Beijing, 2013, pp. 97-101.

Han, Jiawei, et al. "Frequent pattern mining: current status and future directions," Springer Science + Business Media, LLC, Data Min Knowl Disc 2007 vol. 15, pp. 55-86.

* cited by examiner

MULTI-ROUND SESSION INTERACTION METHOD AND SYSTEM, AND COMPUTER DEVICE

CROSS REFERENCE TO RELATED APPLICATIONS

This application claims priority from Chinese Patent Application No. 201410569388.7, submitted to the State Intellectual Property Office (SIPO), on Oct. 22, 2014 and entitled by "Multi-round Session Interaction Method and System", the entire disclosure of which is incorporated by reference in the present application.

TECHNICAL FIELD

The present invention relates to the technical field of communications, in particular to a multi-round session interaction method, system and computer device.

BACKGROUND

Most of the existing multi-round session interaction systems pre-define a system state and a system action set. When the system is running, according to the current system state, an optimal system action is selected from the system action set and outputted through a series of strategies or statistical models.

However, for the task-based session system whose system actions have a tree-like hierarchical dependency relationship, most of the existing solutions to the multi-round session interaction system are suboptimal. For example, it is relatively complex using a multi-round session interaction system which defines rules artificially to customize a task, and prone to arouse conflicts between the plurality of rules. The statistical dialogue system based on reinforcement learning may automatically learn the tree-like dependency relationship under the premise of having sufficient training corpus, but the corpus is difficult to acquire and the learned content is hard to understand and control.

SUMMARY

The embodiment of the present invention provides a multi-round session interaction method, system and computer device, to implement the session interaction of a task-based session system whose system actions have a tree-like hierarchical dependency.

To reach the above target, the embodiment of the present invention provides a method for interacting in a multi-round session, comprising:
  receiving user requirement information;
  mapping the user requirement information to standard requirements contained in nodes of a plurality of locally preset requirement structure trees, the standard requirement contained in each node being a general requirement of standard requirements contained in sub-nodes of the node in the requirement structure trees; and
  outputting content of the standard requirements contained in sub-nodes of a selected non-leaf node or session information corresponding to a selected leaf node, if the standard requirement contained in the selected node in the plurality of requirement structure trees matches the user requirement information.

The embodiment of the present invention further provides a system for interacting in a multi-round session, comprises:
  a receiving module for receiving user requirement information;
  a mapping module for mapping the user requirement information to standard requirements contained in nodes of a plurality of locally preset requirement structure trees, the standard requirement contained in each node being a general requirement of standard requirements contained in sub-nodes of the node in the requirement structure trees; and
  an outputting module for outputting content of the standard requirements contained in sub-nodes of a selected non-leaf node or session information corresponding to a selected leaf node, if the standard requirement contained in the selected node in the plurality of requirement structure trees matches the user requirement information.

According to another aspect of the present invention, the present invention provides a computer device, comprising: one and more processors, a memory and one or more programs, the one or more programs being stored in the memory and comprising instructions configured to be executed by the one or more processors to implement a method for interacting in a multi-round session, the method comprising: receiving user requirement information; mapping the user requirement information to standard requirements contained in nodes of a plurality of locally preset requirement structure trees, the standard requirement contained in each node being a general requirement of standard requirements contained in sub-nodes of the node in the requirement structure trees; and outputting content of the standard requirements contained in sub-nodes of a selected non-leaf node or session information corresponding to a selected leaf node, if the standard requirement contained in the selected node in the plurality of requirement structure trees matches the user requirement information.

According to the multi-round session interaction method, system and computer device provided by the embodiments of the present invention, user requirement information is received; the user requirement information is mapped to standard requirements contained in nodes of a plurality of locally preset requirement structure trees, the standard requirement contained in each node being a general requirement of standard requirements contained in sub-nodes of the node in the requirement structure trees; and content of the standard requirements contained in sub-nodes of a selected non-leaf node or session information corresponding to a selected leaf node is outputted, if the standard requirement contained in the selected node in the plurality of requirement structure trees matches the user requirement information. The above technical solution provides a session interaction method for a task-based session system with a tree-like hierarchical dependency, while improving the matching rate of the user requirement.

DETAILED DESCRIPTION

In the embodiments of the present invention, a preset requirement structure tree is utilized to map the requirement information inputted by a user to standard requirements contained in nodes of the requirement structure tree. The content of the standard requirements contained in sub-nodes of a selected non-leaf node or session information corresponding to a selected leaf node will be outputted, if the standard requirement contained in the selected node matches the user requirement information. The technical solution according to the embodiment of the present invention may be applied to the task-based session system with a tree-like hierarchical dependency.

Embodiment 1

Figure 1:
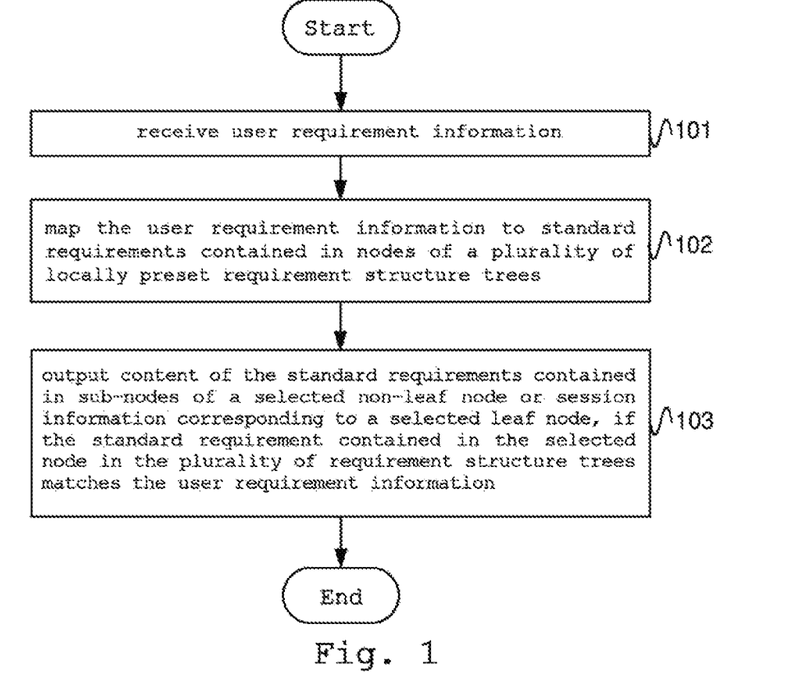
FIG. 1 is a flowchart of a method for interacting in a multi-round session according to an embodiment of the present invention.

FIG. 1 is a flowchart of a method for interacting in a multi-round session according to an embodiment of the present invention. The method may be executed by an interaction system having a multi-round session functionality. As shown in FIG. 1, the multi-round session interaction method particularly comprises the following steps.

S101 is to receive user requirement information.

In the multi-round session interaction system, a user may successively select in requirement candidate boxes provided in an interactive interface or directly type requirement information of interest. For example, a user desirous to know Chihuahua related information may directly type the requirement information such as "Chihuahua". The requirement information may be considered as the user requirement information.

S102 is to map the user requirement information to standard requirements contained in nodes of a plurality of locally preset requirement structure trees, the standard requirement contained in each node being a general requirement of standard requirements contained in sub-nodes of the node in the requirement structure trees.

Figure 2:
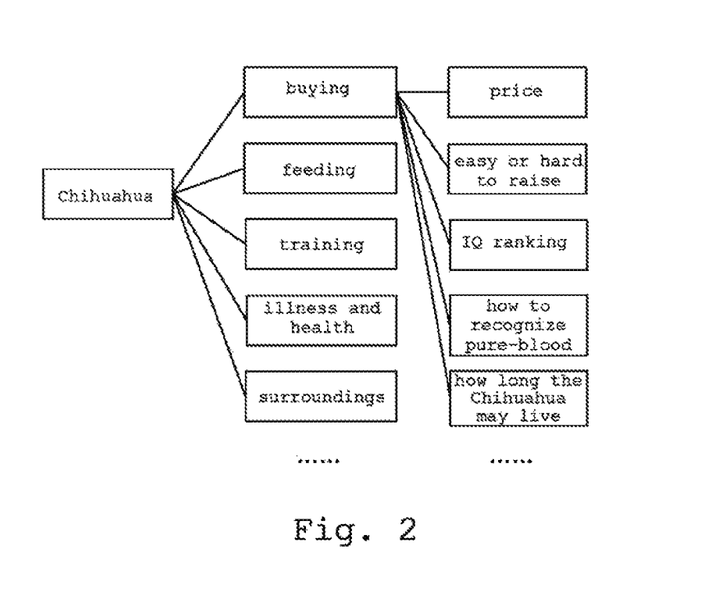
FIG. 2 illustrates a partial structure of the requirement structure tree for a Chihuahua according to the present invention.

The standard requirements contained in the nodes of the plurality of requirement structure trees may be in a tree-like structure established based on a habitual requirement sequence of most users. Each node on the tree represents a standard requirement type. The standard requirement contained in each node has a genus-species relationship with the standard requirement contained in a sub-node of that node. For example, if a user has a standard requirement corresponding to a node, the user likely also has a standard requirement corresponding to a sub-node of the node (if the node has a sub-node). In the circumstances, the standard requirement corresponding to the sub-node may be recommended to the user. FIG. 2 illustrates a partial structure of the requirement structure tree for a Chihuahua. As shown in FIG. 2, each node on the requirement structure tree contains the following information: a node requirement, a standard requirement, a node level (0 represents the root node and the step is 1 increased successively), a parent node index (−1, without a parent node), and a sub-node index (a sub-node list of the node, and null for a node without any sub-node). For example, the node of "buying" as shown in FIG. 2 contains a node requirement "buying" and a standard requirement "buying Chihuahua".

The above requirement structure tree may be constructed in the following fashion.

User behavior log: a session log searched by means of big search, wise search, vertical field search and the like namely, a requirement set searched by the user on a question. Requirement sequences of most users are then counted and mined to form the requirement structure tree.

Field knowledge: for some fields searched unfrequently, a highly credible requirement structure tree is hard to obtain by counting the user behavior log. In the circumstances, requirement mining may be customized for specific fields.

Entity general and specific: the task-based session system having an entity requirement may establish a requirement structure tree by using the general and specific relationship between entities in an entity base. For example, if a user searches a "teacher" related question, the words such as "university teacher", "high school teacher" and "primary school teacher" may be recommended to the user as the specific entities of "teacher", according to the entities having general and specific relationship with "teacher" in the entity base.

Artificial establishment: for very simple vertical fields, the requirement structure tree may be established artificially.

In the process of establishing the requirement structure tree, requirement template mining is further needed to be performed on the mined similar requirements to form the node requirement contained in each node of the requirement structure tree. The requirement template mining may be divided into three parts: requirement clustering, template mining and template verification. Requirement clustering refers to clustering the requirement information searched within the target field according to requirement categories. Template mining refers to extracting the frequent pattern from one type of requirement information by using a frequent pattern mining algorithm (such as prefixSpan). Template verification refers to verifying the matching accuracy of the templates outputted in the last step and discarding ambiguous templates to take the finally retained requirement template as the node requirement contained in each node of the requirement structure tree. Certainly, for less complex fields, the requirement templates may also be artificially configured.

A plurality of requirement structure trees formed with the above-described method are pre-stored in a local memory. After the system receives the user requirement information, the user requirement information may be mapped to a standard requirement contained in each node of the requirement structure trees to analyze the exact requirement of the current user.

S103 is to output content of the standard requirements contained in sub-nodes of a selected non-leaf node or session information corresponding to a selected leaf node, if the standard requirement contained in the selected node in the plurality of requirement structure trees matches the user requirement information.

For example, when the user requirement information is "I want to buy a Chihuahua", it is known by analysis that the standard requirement contained in the user requirement information is "Chihuahua buying". After the user requirement information is mapped to the requirement structure trees, it can be understood that the node "buying" in the requirement structure tree with Chihuahua as the root node is matched. When deciding an output action, the system may output the content of the standard requirements, such as "price", "easy or hard to raise", "IQ ranking", "how to recognize pure-blood" and "how long the Chihuahua may live", contained in sub-nodes of the node "buying" as shown in FIG. 2, as requirement options at the next step for the user. Certainly, this is the case that the matched node is a non-leaf sub-node. For the case that the node matched with the user requirement information is a leaf sub-node of the requirement structure trees, e.g. the node "price" in the requirement structure tree as shown in FIG. 2, the system will directly execute the action corresponding to the matched leaf sub-node, namely, output the session information corresponding to the node "price".

Certainly, in the case that the user requirement information does not match with any standard requirement corresponding to the nodes of all the requirement structure trees, the system may, according to default settings, output a default action such as outputting a requirement recommendation of a certain field or a passage of session.

The method for interacting in a multi-round session provided by the embodiment of the present invention comprises: mapping the user requirement information to standard requirements contained in nodes of a plurality of locally preset requirement structure trees, and outputting content of the standard requirements contained in sub-nodes of a selected non-leaf node or session information corresponding to a selected leaf node, if the standard requirement contained in the selected node in the plurality of requirement structure trees matches the user requirement information. The technical solution according to the embodiment of the present invention may be applied to the task-based session system with a tree-like hierarchical dependency.

Embodiment 2

Figure 3:
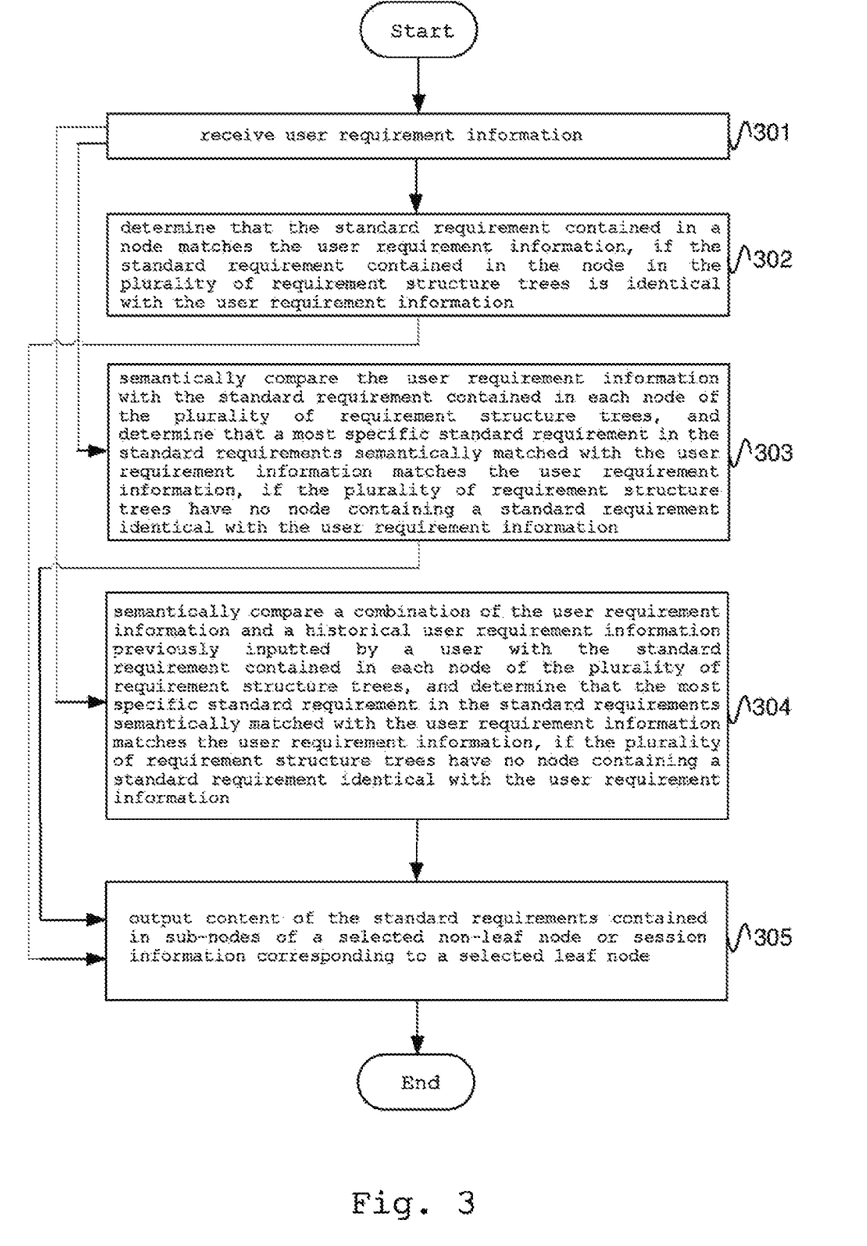
FIG. 3 is a flowchart of a method for interacting in a multi-round session according to another embodiment of the present invention.

FIG. 3 is a flowchart of a method for interacting in a multi-round session according to another embodiment of the present invention, which is a specific implementation of the method of the embodiment as shown in FIG. 1. As shown in FIG. 3, the method for interacting in a multi-round session comprises the following steps.

S301 is to receive user requirement information. The detailed process of the step may refer to the corresponding content of the step 101.

S302 is to determine that the standard requirement contained in a node matches the user requirement information, if the standard requirement contained in the node in the plurality of requirement structure trees is identical with the user requirement information.

The identity between the standard requirement and the user requirement information means that the text information contained in both of them is identical, but the word orders may be different. For example, the user requirement information "Chihuahua buying" and the user requirement information "buying Chihuahua" maybe each regarded as identical with the standard requirement "Chihuahua buying". If the standard requirement contained in the node in the plurality of requirement structure trees is identical with the user requirement information, it can be determined that the standard requirement contained in a node matches the user requirement information.

Alternatively, in S303, the plurality of requirement structure trees have no node containing a standard requirement identical with the user requirement information, and then:

the user requirement information is semantically compared with the standard requirement contained in each node of the plurality of requirement structure trees, and it is determined that a most specific standard requirement in the standard requirements semantically matched with the user requirement information matches the user requirement information;

If the plurality of requirement structure trees have no node containing a standard requirement identical with the user requirement information, the user requirement information can be semantically compared with the standard requirement corresponding to each node of the plurality of requirement structure trees, and the most specific standard requirement in the standard requirements semantically matched with the user requirement information is determined to be matched with the user requirement information.

For example, when the user requirement information is "I want to buy a Chihuahua", it can be seen that no node contains a standard requirement identical with the user requirement information. In the circumstances, entity splitting may be performed on the user requirement information, firstly. For example, "I want to buy a Chihuahua" may be split into three entities: "I", "buying" and "Chihuahua". Then, the three entities in combination are compared with the standard requirement contained in each node of the plurality of requirement structure trees. The comparison means determining whether the standard requirement is contained in the entity set corresponding to the user requirement information. If yes, the standard requirement is regarded as being matched with the requirement information. For example, if the standard requirements "Chihuahua" and "Chihuahua buying" are both matched with the entity set formed by analyzing the user requirement information "I want to buy a Chihuahua", the most specific standard requirement matched with the entity set is determined to be matched with the user requirement information, that is, "Chihuahua buying" is selected.

Alternatively, in S304, if the plurality of requirement structure trees have no node containing a standard requirement identical with the user requirement information, a combination of the user requirement information and a historical user requirement information previously inputted by a user is semantically compared with the standard requirement contained in each node of the plurality of requirement structure trees, and it is determined that the most specific standard requirement in the standard requirements semantically matched with the user requirement information matches the user requirement information.

If the plurality of requirement structure trees have no node containing a standard requirement identical with the user requirement information and the user requirement information inputted by the user every time may not completely include the standard requirement corresponding to a certain node of the requirement structure trees, the system cannot recognize the content of the current user requirement. In the circumstances, the system may combine several pieces of user requirement information previously inputted by the user with the current user requirement information, and make a judgment on the content of the current requirement of the user in entire. For example, the user inputs "I want to buy a Chihuahua" in the last round, and directly inputs "how much" in this round. "How much" cannot match with any standard requirement, but the Chihuahua price inquiry requirement of the user is a session action that may be provided by the system. Thus, the system may semantically combine the last user requirement information inputted by the user with the current user requirement information, and then make a comparison for the combined user requirement information in the above comparison manner, thereby determining the standard requirement "buying price of Chihuahua" as the standard requirement matched with the current requirement of the user.

The steps S302, S303 and S304 may be regarded as three specific implementations of the step S102. In the embodiment, when the user requirement information is mapped to standard requirements contained in nodes of a plurality of locally preset requirement structure trees to determine the matched standard requirement, the method for matching the current user requirement information may improve the matching rate, namely, increase the matching possibility the standard requirement, by using the semantical matching and the context of the user requirement information.

Step S305 shall be executed after the step S302, S303 or S304.

S305 is to output the content of the standard requirements contained in sub-nodes of a selected non-leaf node or session information corresponding to a selected leaf node. The detailed process of this step may refer to the corresponding content of the step S103.

To provide plentiful recommended requirements based on the current user requirement, the standard requirements contained in the sibling nodes of the selected node (a non-leaf sub-node or a leaf sub-node) may be outputted to provide more recommended requirement options for the user. For example, when the system outputs the standard requirement contained in each sub-node of the node "buying" as shown in FIG. 2, the system may also output the standard requirements corresponding to the sibling nodes, including "feeding", "training", "illness and health", and "surroundings", etc., of the node of "buying" for the user to choose.

What should be explained herein is that the method of the embodiment further comprises: establishing the requirement structure trees in different fields by training and learning with a user behavior log and knowledge in various fields. Detailed establishment basis and principle may refer to the foregoing content, and will be omitted herein. The system may update the formed requirement structure trees, or increase or reduce the nodes as required.

The method for interacting in a multi-round session provided by the embodiment of the present invention comprises: mapping the user requirement information to standard requirements contained in nodes of requirement structure trees, and outputting the content of the standard requirements contained in sub-nodes of a selected non-leaf node or session information corresponding to a selected leaf node, if the standard requirement contained in the selected node matches the requirement information. In the detailed process of mapping, a standard requirement may be selected by determining whether the user requirement information is identical with the standard requirement, determining whether the user requirement information is matched with the standard requirement, and determining whether the combination of contextual requirement information including the current user requirement information is matched with the standard requirement. Thus, not only a task-based session interaction with a tree-like hierarchical dependency is achieved, but also the matching possibility of the standard requirement is improved.

The above description is merely specific embodiments of the present invention, but the protection scope of the present invention is not limited thereto. Those skilled in the art may make various changes and substitutions within the disclosure of the present invention. Those changes and substitutions shall be in the protection scope of the present invention. Therefore, the protection scope of the claims shall be regarded as the protection scope of the present invention.

Embodiment 3

Figure 4:
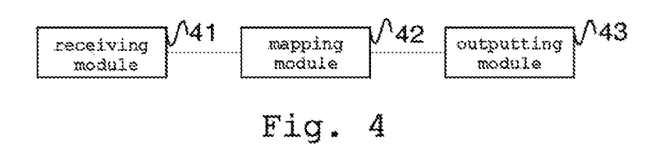
FIG. 4 is a structure diagram of a system for interacting in a multi-round session provided by an embodiment of the present invention.

FIG. 4 is a structure diagram of a system for interacting in a multi-round session provided by an embodiment of the present invention, which may execute the method as shown in FIG. 1. As shown in FIG. 4, the system for interacting in a multi-round session comprises: a receiving module 41, a mapping module 42 and an outputting module 43.

The receiving module 41 is used for receiving the user requirement information.

The mapping module 42 is used for mapping the user requirement information to standard requirements contained in nodes of a plurality of locally preset requirement structure trees, the standard requirement contained in each node being a general requirement of standard requirements contained in sub-nodes of the node in the requirement structure trees.

The outputting module 43 is used for outputting content of the standard requirements contained in sub-nodes of a selected non-leaf node or session information corresponding to a selected leaf node, if the standard requirement contained in the selected node in the plurality of requirement structure trees matches the user requirement information.

Figure 5:
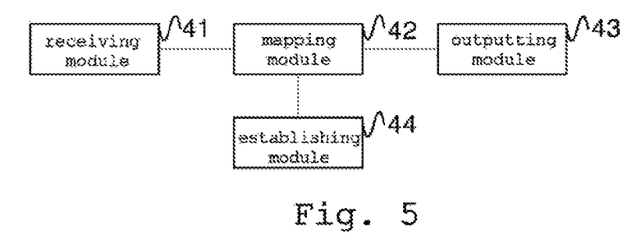
FIG. 5 is a structure diagram of a system for interacting in a multi-round session provided by another embodiment of the present invention.

Further, on the basis of the embodiment as shown in FIG. 4, the system for interacting in a multi-round session as shown in FIG. 5 may further comprises an establishing module 44 for establishing the requirement structure trees in different fields by training and learning with a user behavior log and knowledge in various fields.

Further, in the system for interacting in a multi-round session as shown in FIG. 5, the mapping module 42 is used for determining that the standard requirement contained in a node matches the user requirement information, if the standard requirement contained in the node in the plurality of requirement structure trees is identical with the user requirement information.

Further, in the system for interacting in a multi-round session as shown in FIG. 5, the plurality of requirement structure trees have no node containing a standard requirement identical with the user requirement information, and the mapping module 42 is further used for:

semantically comparing the user requirement information with the standard requirement contained in each node of the plurality of requirement structure trees, and determining that a most specific standard requirement in the standard requirements semantically matched with the user requirement information matches the user requirement information; or semantically comparing a combination of the user requirement information and a historical user requirement information previously inputted by a user with the standard requirement contained in each node of the plurality of requirement structure trees, and determining that the most specific standard requirement in the standard requirements semantically matched with the user requirement information matches the user requirement information.

Further, in the system for interacting in a multi-round session as shown in FIG. 5, the outputting module 43 is further used for outputting content of the standard requirements contained in sibling nodes of the selected node.

According to the system for interacting in a multi-round session provided by the embodiment of the present invention, the user requirement information is mapped to standard requirements contained in nodes of requirement structure trees, and the content of the standard requirements contained in sub-nodes of a selected non-leaf node or session information corresponding to a selected leaf node is outputted, if the standard requirement contained in the selected node matches the requirement information. Thus, a session interaction based on a task-based session interaction system with a tree-like hierarchical dependency is achieved, and the matching rate of the user requirement is improved.

Further, in the detailed process of mapping of the method for interacting in a multi-round session, a standard requirement may be selected by determining whether the user requirement information is identical with the standard requirement, determining whether the user requirement information is matched with the standard requirement, and determining whether the combination of contextual requirement information including the current user requirement information is matched with the standard requirement. Thus, not only a task-based session interaction with a tree-like hierarchical dependency is achieved, but also the matching possibility of the standard requirement is improved.

Embodiment 4

Figure 6:
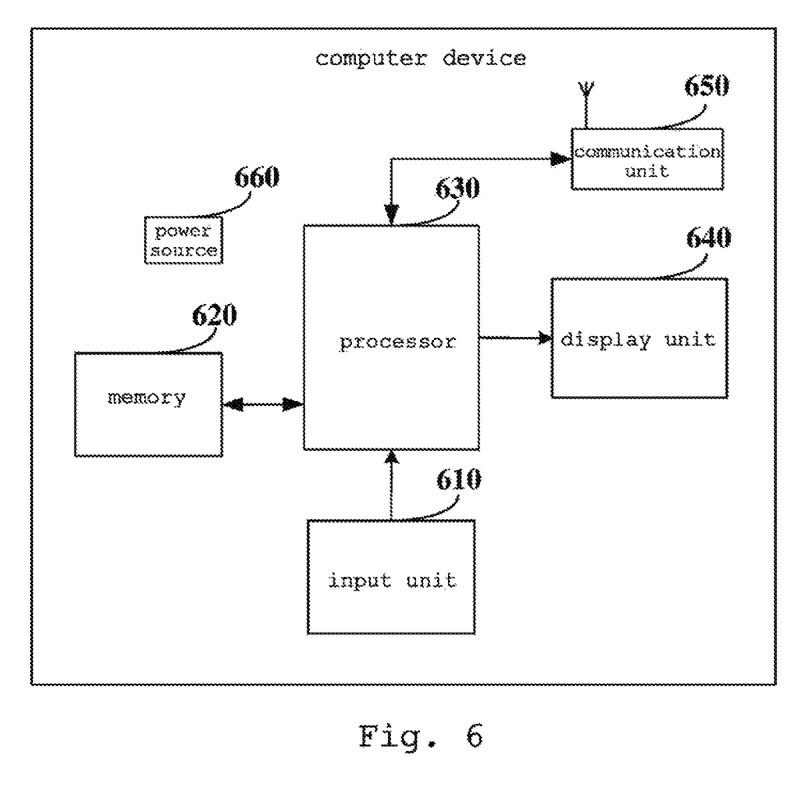
FIG. 6 is a logic block diagram of a computer device of an exemplary embodiment of the present invention.

FIG. 6 is a logic block diagram of a computer device of an exemplary embodiment of the present invention.

With reference to FIG. 6, the computer device may be used to implement the method for interacting in a multi-round session provided by the above embodiment. The detailed description of the computer device will be given as below.

The computer device may comprises an input unit 610, a memory 620 containing one or more computer-readable storage media, a processor 630 containing one or more processing cores, a display unit 640, a communication unit 650, and a power source 660. Those skilled in the art shall understand that the illustrated structure of the computer device does not limit the computer device which may comprise more or fewer components as shown in the drawings, the combination of certain components, or different arrangement of the components.

The memory 620 may be used for storing software programs and data. The processor 630 runs the software programs and data stored in the memory 620 to execute various functional applications and data processing. The memory 620 may mainly comprises a program storage area and a data storage area, wherein the program storage area may store an operating system and an application program required for at least one function (such as the voice playing function, image display function or the like), and the data storage area may store the created data (such as the voice data, phone book or the like) according to the use of the computer device. In addition, the memory 620 may comprise a high speed random access memory, a non-volatile memory, such as at least one disk memory device and flash memory device, and/or other volatile solid-state memory devices. Accordingly, the memory 620 may further comprise a memory controller to provide the access of the input unit 610 and the processor 630 to the memory 620.

The processor 630 is the control center of the computer device, uses various interfaces and wires to connect parts of the entire computer device, and executes various functions of the computer device and processes data through running or executing the software programs and/or modules stored in the memory 620 and invoking the data stored in the memory 620, thus performing the overall monitoring on the computer device.

The display unit 640 may be used for displaying the information inputted by the user or the information provided for the user and various graphical user interfaces of the computer device. The graphical user interfaces may include graphics, texts, icons, videos and any combination thereof. The display unit 640 may comprise a display panel which, optionally, may be configured with an LCD (Liquid Crystal Display), an OLED (Organic Light-Emitting Diode) or the like. Although the input unit 610 and the display unit 640 are illustrated in the drawings as two separate components to achieve input and output functions, the input unit 610 and the display unit 640 may be integrated in some embodiments to achieve the input and output functions.

The communication unit 650 may be used for receiving and transmitting information, or receiving and transmitting signals in the process of session. The communication unit 650 may be an RF (Radio Frequency) circuit, a router, a modem, or another network communication device. In addition, the communication unit 650 may communicate with the Internet and other communication devices through wireless communication. The wireless communication may use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service) and the like.

The computer device may further comprise a power source 660 (such as a battery) for supplying power for each component. Preferably, the power source may be logically connected with the processor 630 through a power management system, thus achieving the functions of charging, discharging, power consumption management and the like through the power management system. The power source 660 may further comprise one or more DC or AC power supplies, a recharging system, a power failure detection circuit, a power converter or inverter, a power status indicator and any other component.

Although not shown, the computer device may further comprise a camera, a Bluetooth module, a sensor (such as optical sensor, motion sensor and other sensors), an audio circuit, a wireless communication unit and the like, the detailed description of which will be omitted.

In the embodiment, the computer device comprises one or more processors 630, a memory 620 and one or more programs, the one or more programs being stored in the memory and comprising instructions configured to be executed by the one or more processors to implement a method for interacting in a multi-round session, the method comprising: receiving user requirement information; mapping the user requirement information to standard requirements contained in nodes of a plurality of locally preset requirement structure trees, the standard requirement contained in each node being a general requirement of standard requirements contained in sub-nodes of the node in the requirement structure trees; and outputting content of the standard requirements contained in sub-nodes of a selected non-leaf node or session information corresponding to a selected leaf node, if the standard requirement contained in the selected node in the plurality of requirement structure trees matches the user requirement information.

Furthermore, the mapping of the user requirement information to standard requirements contained in nodes of a plurality of locally preset requirement structure trees comprises: determining that the standard requirement contained in a node matches the user requirement information, if the standard requirement contained in the node in the plurality of requirement structure trees is identical with the user requirement information.

Furthermore, the plurality of requirement structure trees have no node containing a standard requirement identical with the user requirement information, and the mapping of the user requirement information to standard requirements contained in nodes of a plurality of locally preset requirement structure trees comprises: semantically comparing the user requirement information with the standard requirement contained in each node of the plurality of requirement structure trees, and determining that a most specific standard requirement in the standard requirements semantically matched with the user requirement information matches the user requirement information; or semantically comparing a combination of the user requirement information and a historical user requirement information previously inputted by a user with the standard requirement contained in each node of the plurality of requirement structure trees, and determining that the most specific standard requirement in the standard requirements semantically matched with the user requirement information matches the user requirement information.

Furthermore, the outputting of content of the standard requirements contained in sub-nodes of a selected non-leaf node or session information corresponding to a selected leaf node comprises: outputting content of the standard requirements contained in sibling nodes of the selected node.

In addition, the memory 620 further comprises an instruction for executing the following process: establishing the requirement structure trees in different fields by training and learning with a user behavior log and knowledge in various fields.

According to the computer device provided by the embodiment of the present invention, the user requirement information is mapped to standard requirements contained in nodes of requirement structure trees, and the content of the standard requirements contained in sub-nodes of a selected non-leaf node or session information corresponding to a selected leaf node is outputted, if the standard requirement contained in the selected node matches the requirement information. Thus, a session interaction based on a task-based session interaction system with a tree-like hierarchical dependency is achieved, and the matching rate of the user requirement is improved.

Further, in the detailed process of mapping of the method for interacting in a multi-round session, a standard requirement may be selected by determining whether the user requirement information is identical with the standard requirement, determining whether the user requirement information is matched with the standard requirement, and determining whether the combination of contextual requirement information including the current user requirement information is matched with the standard requirement. Thus, not only a task-based session interaction with a tree-like hierarchical dependency is achieved, but also the matching possibility of the standard requirement is improved.

It should be explained that the above embodiments are merely used to illustrate but not to restrict the technical solutions of the present invention. Although the present invention is detailed with reference to the embodiments, the skilled in the art should understand that the technical solutions described in the embodiments may be modified, and some or all of the technical features of a technical solution may be equivalently substituted. These modifications or substitutions do not deviate the essence of the corresponding technical solutions from the scope of the technical solutions of the embodiments of the present invention.

What is claimed is:

1. A method for interacting in a multi-round session, comprising:
  receiving user requirement information through a a current input of a computer device;
  by a processor of the computer device, establishing a plurality of locally preset requirement structure trees for different fields by training and learning with a user behavior log and knowledge in various fields, the user behavior log comprising information mined from requirement searches from a plurality of users in various fields, wherein establishing a plurality of locally preset requirement structure trees further comprises:
  clustering the user requirement information according to requirement categories;
  extracting a pattern from the clustered user requirement information;
  outputting one or more templates based on the extracted pattern;
  verifying matching accuracy of the one or more templates; and
  retaining one of the one or more templates based on a result of verifying the matching accuracy,
  by the processor of the computer device, mapping the user requirement information to standard requirements contained in nodes of the plurality of locally preset requirement structure trees, the standard requirement contained in each node being a general requirement of standard requirements contained in sub-nodes of the node in the requirement structure trees; and
  outputting content of the standard requirements contained in sub-nodes of a selected node or session information corresponding to the selected node to a display, if the standard requirement contained in the selected node in the plurality of requirement structure trees matches the user requirement information,
  wherein in response to determining that the plurality of requirement structure trees have no node containing a standard requirement that is identical to the user requirement information, the mapping of the user requirement information to standard requirements contained in nodes of a plurality of locally preset requirement structure trees comprises splitting the user requirement information into N parts, N being an integer greater than 1; combining one or more parts of the N parts of the user requirement information of the current input with a part of user requirement information of a historical input to form new user requirement information including the part of the user requirement information of the current input and the part of the user requirement information of the historical input; comparing the new user requirement information with the standard requirements contained in the plurality of requirement structure trees; determining the standard requirements matching the new user requirement information from the plurality of requirement structure trees as the standard requirement matching the user requirement information of the current input.

2. The method according to claim 1, wherein the mapping of the user requirement information to standard requirements contained in nodes of a plurality of locally preset requirement structure trees comprises:
  determining that the standard requirement contained in a node matches the user requirement information, if the standard requirement contained in the node in the plurality of requirement structure trees is identical with the user requirement information.

3. The method according to claim 1, wherein the outputting of content of the standard requirements contained in sub-nodes of a selected node or session information corresponding to the selected node comprises:
outputting content of the standard requirements contained in sibling nodes of the selected node.

4. The method according to claim 1, further comprising updating the plurality of locally preset requirement structure trees by increasing or decreasing a number of the nodes of the plurality of locally preset requirement structure trees.

5. A system for interacting in a multi-round session, the system comprising a processor configured to:
receive user requirement information through a current input;
establish a plurality of locally preset requirement structure trees in different fields by training and learning with a user behavior log and knowledge in various fields, the user behavior log comprising information mined from requirement searches from a plurality of users in various fields, wherein the processor is configured to establish the plurality of locally present requirement structure trees are established by:
clustering the user requirement information according to requirement categories;
extracting a pattern from the clustered user requirement information;
outputting one or more templates based on the extracted pattern;
verifying matching accuracy of the one or more templates; and
retaining one of the one or more templates based on a result of verifying the matching accuracy;
map the user requirement information to standard requirements contained in nodes of the plurality of locally preset requirement structure trees, the standard requirement contained in each node being a general requirement of standard requirements contained in sub-nodes of the node in the requirement structure trees; and
output content of the standard requirements contained in sub-nodes of a selected node or session information corresponding to the selected node, if the standard requirement contained in the selected node in the plurality of requirement structure trees matches the user requirement information,
wherein in response to a determination that the plurality of requirement structure trees have no node containing a standard requirement that is identical to the user requirement information, the mapping of the user requirement information to standard requirements contained in nodes of a plurality of locally preset requirement structure trees comprises splitting the user requirement information into N parts, N being an integer greater than 1; combining one or more parts of the N parts of the user requirement information of the current input with a part of user requirement information of a historical input to form new user requirement information including the part of the user requirement information of the current input and the part of the user requirement information of the historical input; comparing the new user requirement information with the standard requirements contained in the plurality of requirement structure trees; determining the standard requirements matching the new user requirement information from the plurality of requirement structure trees as the standard requirement matching the user requirement information of the current input.

6. The system according to claim 5, wherein the processor is configured to determine that the standard requirement contained in a node matches the user requirement information, if the standard requirement contained in the node in the plurality of requirement structure trees is identical with the user requirement information.

7. The system according to claim 5, wherein the processor is further configured to output content of the standard requirements contained in sibling nodes of the selected node.

8. The system according to claim 5, wherein the processor is configured to increase or decrease a number of the nodes of the plurality of locally preset requirement structure trees.

9. A computer device comprising:
one or more processors;
a memory; and
one or more programs, the one or more programs being stored in the memory and comprising instructions configured to be executed by the one or more processors to implement a method for interacting in a multi-round session, the method comprising:
receiving user requirement information through a current input;
establishing a plurality of locally preset requirement structure trees in different fields by training and learning with a user behavior log and knowledge in various fields, the user behavior log comprising information mined from requirement searches from a plurality of users in various fields, wherein establishing a plurality of locally preset requirement structure trees further comprises:
clustering the user requirement information according to requirement categories;
extracting a pattern from the clustered user requirement information;
outputting one or more templates based on the extracted pattern;
verifying matching accuracy of the one or more templates; and
retaining one of the one or more templates based on a result of verifying the matching accuracy;
mapping the user requirement information to standard requirements contained in nodes of a plurality of locally preset requirement structure trees, the standard requirement contained in each node being a general requirement of standard requirements contained in sub-nodes of the node in the requirement structure trees; and
outputting content of the standard requirements contained in sub-nodes of a selected node or session information corresponding to the selected node, if the standard requirement contained in the selected node in the plurality of requirement structure trees matches the user requirement information,
wherein in response to determining that the plurality of requirement structure trees have no node containing a standard requirement that is identical to the user requirement information, the mapping of the user requirement information to standard requirements contained in nodes of a plurality of locally preset requirement structure trees comprises splitting the user requirement information into N parts, N being an integer greater than 1; combining one or more parts of the N parts of the user requirement information of the current input with a part of user requirement information of a historical input to form new user requirement information including the part of the user requirement information of the current input and the part of the user requirement information of the historical input; comparing the new user requirement information with the standard requirements contained in the plurality of requirement structure trees; determining the standard requirements matching the new user requirement information from the plurality of requirement structure trees as the standard requirement matching the user requirement information of the current input.

10. The computer device according to claim 9, wherein the method further comprises updating the plurality of locally preset requirement structure trees by increasing or decreasing a number of the nodes of the plurality of locally preset requirement structure trees.

\* \* \* \* \*